Figure 1:
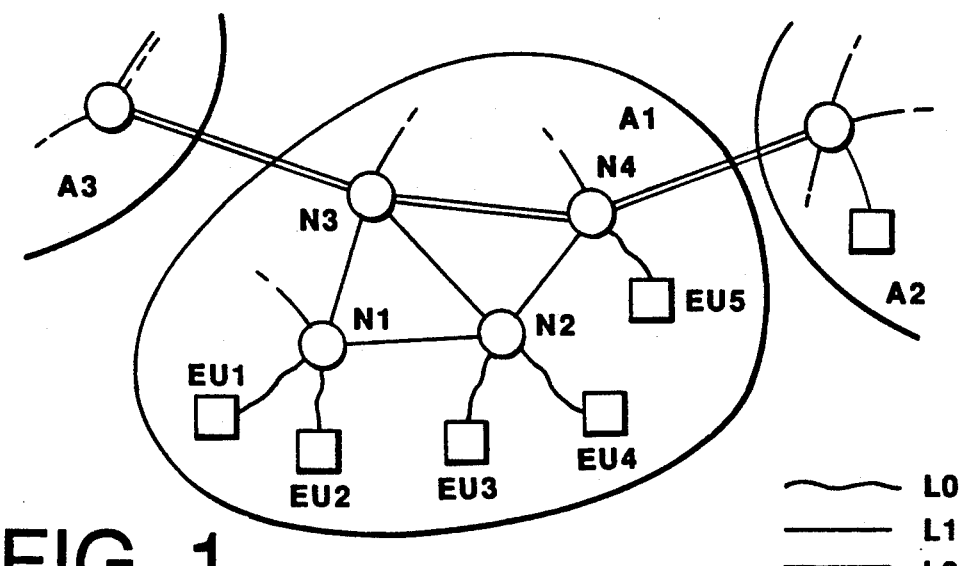

US005305305A

United States Patent [19]
Harper et al.

[11] Patent Number: 5,305,305
[45] Date of Patent: Apr. 19, 1994

[54] MESSAGE SWITCHING NETWORK MONITORING

[75] Inventors: John A. Harper, Reading; Francis Dolan, Thatcham, both of United Kingdom

[73] Assignee: Digital Equipment International Limited, Fribourg, Switzerland

[21] Appl. No.: 732,366

[22] Filed: Jul. 18, 1991

[30] Foreign Application Priority Data

Jul. 18, 1990 [GB] United Kingdom ............... 9015760

[51] Int. Cl.$^5$ ........................................... H04L 12/26
[52] U.S. Cl. ..................................... 370/13; 370/60; 370/94.1
[58] Field of Search ............... 370/13, 14, 53, 60, 370/60.1, 85.13, 85.14, 94.1, 94.3, 58.1, 58.2

[56] References Cited

U.S. PATENT DOCUMENTS

| | | | |
|---|---|---|---|
| 4,864,559 | 9/1989 | Perlman | 370/94.3 |
| 5,008,882 | 4/1991 | Peterson et al. | 370/94.1 |
| 5,018,133 | 5/1991 | Tsukakoshi et al. | 370/94.3 |
| 5,031,093 | 7/1991 | Hasegawa | 370/17 |
| 5,038,345 | 8/1991 | Roth | 370/94.1 |

OTHER PUBLICATIONS

10th Conference on Local Computer Networks, Oct. 1985, Minneapolis, Minn., pp. 32-40, C. J. Cotton "Methods for Internet Monitoring".
Compcon Spring 1987, Feb. 1987, San Francisco, Calif. pp. 64-70; P. D. Amer et al "Local Area Broadcast Network Measurement: *Traffic Characterization*".
Technische Rundschau, Sep. 23, 1988, Bern, CH pp. 64-69; I. Roman et al; "*Verteilte Netze*".

*Primary Examiner*—Benedict V. Safourek
*Attorney, Agent, or Firm*—Kenneth F. Kozik; A Sidney Johnston; Albert P. Cefalo

[57] ABSTRACT

A message switching network is disclosed which consists of end units between which messages flow. The end units are coupled together directly (via LANs) or via common switching nodes through level 0 links; the nodes are coupled together via level 1 links; and the nodes are grouped into areas which are coupled together via level 2 links. A message entering a node has its destination area code compared with the node's area code, and an area/port table or an end unit/port table is used to look up the output port which is coupled to the end unit, next node in the area, or next area to which that message is to be delivered. Logic circuitry determines the incoming and outgoing levels, and a transition between levels is logged together with certain details of the message. Messages are thus monitored—i.e., their passage is recorded—when they cross levels in the hierarchy. Thus, provided the network is "well-behaved", messages are accurately counted and categorized according to the distances which they travel through the network.

12 Claims, 2 Drawing Sheets

MESSAGE SWITCHING NETWORK MONITORING

The present invention relates to the monitoring of messages in message switching networks.

A message switching network is a network of message forwarding stations (switching nodes) by means of which various message originating and receiving stations (end-users) are interconnected. Messages are originated and received by the end-users. The role of the network is to route the messages between the end—users. A switching node is generally connected to several others. Each node has input and output ports for each end-user and each other node it is connected to, and means for inspecting each incoming message to determine which node or end-user it should forward the message to (i.e. which output port it should send the message out on).

There will be various messages (or, often, streams of messages) simultaneously passing through the network between the various end-users. (In a digital switching network, the messages are carried in packets. The terms "message" and "packet" will be used interchangeably herein.) The individual messages of a stream of messages between a pair of end-users need not all follow the same route through the network. The network has the responsibility of dealing with each message individually, and in some networks, it may happen that different messages of a single stream follow different routes through the network.

There are many variations of network architecture. In a sense, the simplest possible system has all end-users connected to a common message medium (so that there is no switching node in the above sense). A local area network (LAN) is an example of such a system. Another extremely simple form has all end-users connected to a single switching node.

These systems are, however, suitable only for networks which are generally geographically compact and have only a fairly small number of end-users. For somewhat larger systems, there will be a plurality of switching nodes, with each end-user being connected to only a few nodes (often, only a single node). For larger systems still, the nodes themselves may be grouped into groups or areas, with the nodes in each area being treated as associated and the areas being treated as distinct from an administrative point of view.

It is often desirable to monitor the usage of a message switching network, for a variety of reasons. It may be desirable to detect areas of the network where the usage (message flow) is high, so that the location of bottlenecks can be detected and appropriate action taken. Suitable monitoring may be needed to detect errors in the operation of the system. And, more recently, interest has been growing in the possibility of charging users for use of such a system.

A great variety of monitoring techniques are possible. The message flow through any node can be monitored (provided the node has the appropriate capacity). The message flow to and from an end-user can be monitored by that end-user (provided that the appropriate discipline can be exerted to ensure that the end-user carries out the monitoring properly).

However, many usage monitoring functions which might be desirable are either technically difficult to perform or can in principle be performed without great difficulty but turn out in practice to impose heavy additional loading on the network.

For example, one might consider measuring the load which each message imposes on the network as the number of switching nodes which that message passes through on its way from the originating end-user to the destination end-user. This could be implemented by including a distance count (hop count) in each message. The count would be set to 0 when a message is sent out by an end-user, and the switching nodes would be arranged so that each intermediate one increments the distance count when a message passes through it to another node, and the final one extracts the count as it passes the message to the destination end-user.

To be of value, the extracted counts would have to be accompanied by some further identifying information, and would have to be assembled and processed in some way.

The addresses of the destination end-users would be relatively easy to keep, because there are relatively few end-users for each switching node. If each end-user is connected to a single switching node, then that node will automatically collect all the information relating to that end-user. If an end-user can be connected to more than one node, then the information relating to an end-user may be distributed among several switching nodes, and has to be collected together into a single location. Since only a few nodes are connected to any end-user and those nodes are generally relatively close together, this task does not appear unduly severe (although there may be considerable difficulties when it is considered in detail).

However, it is more usual to measure loading with reference to the sources of the messages producing the loading, rather than to the relatively passive receivers of such messages. To do this, the usage information from each message would have to be collated with reference to the sources of the messages. This might be done by sending the loading information for each message back to the originating end-user (or a station near to it), or by using a single central station to collate all loading information. In either case the number of messages passing through the system is doubled, so such monitoring comes close to halving the capacity of the system (as well as requiring additional functionality at the switching nodes).

The network can of course be monitored at selected locations, but that is a rather coarse technique. Messages which do not pass through the selected locations will not be registered at all, while those which happen to pass through more than one such location will be registered more than once.

There is therefore a need for a useful and efficient method of monitoring a message switching network which gives a reasonable measure of the usage due to message origination.

It is evident that a fairly simple message switching network, with a relatively small number of switching nodes, can be regarded as hierarchical, with the end-users forming the lower level of the hierarchy and the switching nodes the higher level.

This hierarchy of stations is reflected in a corresponding hierarchy of links. If the end-users are connected only to the switching nodes, then the hierarchy of links is straightforward. Links to end-users form the lower level of the hierarchy, say level 0, while links between switching nodes form the higher level, say level 1. If some end-users are able to communicate with each other directly, then the hierarchy becomes more complicated, but the distinction between levels 0 and 1 remains; level 1 involves switching node to switching node links.

The links between switching nodes may be of a different character than the links between end-users and switching nodes (or end-users direct to end-users). The links of the two levels of the hierarchy will then be physically distinct.

If the switching nodes are themselves grouped into areas, as described above, then the network can be described as a hierarchy with 3 levels. Also, the hierarchy can in principle be extended further. Thus the areas into which the switching nodes are grouped can themselves be grouped into higher level groups (termed domains).

The basic principle of the present invention is that messages should be monitored—i.e., their passage should be recorded in some way—when they cross levels in the hierarchy. The fundamental advantage of this is that if the network is "well-behaved"—that is, if a message between end-users passes steadily up the hierarchy and back down again with only one change of direction—then messages can be accurately counted and categorized according to the distances which they travel through the network (for a suitable definition of distance, such as hop count (possibly weighted)).

More specifically, the present invention provides a message switching network comprising a plurality of end unit stations connected together via switching node stations. The stations and/or connections are ordered hierarchically. Monitoring means monitor the transitions of messages between different levels of the hierarchy. The monitoring means may comprise separate monitoring units in some or all of the switching nodes. Alternatively or additionally, if the system includes channels (such as LANs, as discussed above) to which a plurality of end-users are coupled, the monitoring means may comprise monitoring units coupled to some or all such channels.

The information which the monitoring means utilizes to determine level transitions may include some or all of the following: the level of the link on which a message enters a switching node, the level of the link on which it leaves the node, and the extent to which the identifiers (IDs) of the source and destination addresses in the message match the IDs of its current location in the network.

The monitoring means may also include means for inserting information into a message regarding the level transitions which it undergoes as it passes through the network, and for utilizing such information.

In a "well-behaved" system, a message between end-users in different node areas will in general pass steadily up the hierarchy and back down again. That is, it will start its journey over a level 0 link from the source end-user to a node in its local area, then through one or more level 1 links to other nodes in that area, then over various level 2 links between different areas, then through various level 1 links in the area of the destination end-user, and finally through a level 0 link to that end-user.

With a 3-level network, message paths are categorized into 3 classes: direct (passing over only level 0 links, going from end-user to end-user directly via a channel (e.g. LAN) or possibly via a single switching node); local (passing through at least two switching nodes, i.e. over at least one level 1 link, but staying within a single area); and long-distance (passing through at least two different areas). By recording the passage of a message only when it crosses from one level to another in the hierarchy, it is clear that it will be counted only once for any particular change of level. (Normally messages will be counted as they go up in level, but they can be counted as they come down in level, either as well as or instead of being counted when going up.)

There are however two drawbacks to the use of this technique when applied to practical message switching networks.

First, it may happen that the first node which the message reaches, direct from the source end-user, has a direct level 2 link towards the area of the destination end-user. In this case, the message will jump direct from level 0 to level 2. (It can also, of course, jump direct from level 2 down to level 0 at the destination end.) However, there is generally little difficulty in arranging for the system to treat a "jump" change of level as two simultaneous "non-jump" changes of level (i.e. changes from one level to an adjacent level).

The second drawback arises from the complexity of most practical systems.

If there were a single "master" switching node per area, with all connections between areas being between the respective "master" nodes in these areas, then the "master" nodes and the connections between them would form a well-defined level 2 of the hierarchy, above levels 0 and 1. This would be a well-behaved system. In it, a message would start off and end at level 0. In its journey, it might pass up the hierarchy to level 1 or level 2 and back down again. But there could be only one change of direction; once a message had changed levels downwards, it could never go up again from the level it has changed down to.

In practice, however, this simple arrangement seldom occurs. Instead, several switching nodes in an area may be involved in links with other areas. If a message has to pass through such an intermediate area between the source and destination areas, it may therefore happen that it enters the intermediate area at one node and leaves it at another, so passing between two (or more) nodes in the same area. The message may thus follow the same path through the intermediate area as a message between two end-users in the area.

However, although the paths may be the same for the two messages, the node can be arranged to treat level 2 messages which are merely passing through it differently from level 1 messages which originate and/or terminate in that area. (In fact, this distinction is already implicit in most message switching networks of this type.) Thus although there is only a single physical link between the two nodes, it behaves (or can readily be arranged to behave) as two logically distinct links, one of level 1 and the other of level 2.

The present system is therefore applicable to the great majority of multi-level message switching networks even though they may well suffer from one or both of the two drawbacks discussed above.

The techniques of the present system may also be applied even in networks which are not well-behaved in the above sense, but duplicated counting would then be liable to occur and the results would be a less accurate indication of the network usage.

The fact that the present system avoids duplicated counting makes it particularly suitable for monitoring intended for accounting purposes. The present system provides a clearly defined categorization for charging and avoids any danger of duplicated charging. Both these features are highly desirable for charging and accounting purposes, because user resistance and dissatisfaction will almost always be high if there is unclear categorization or double charging.

Figure 2A:
Figure 2B:
Figure 3:
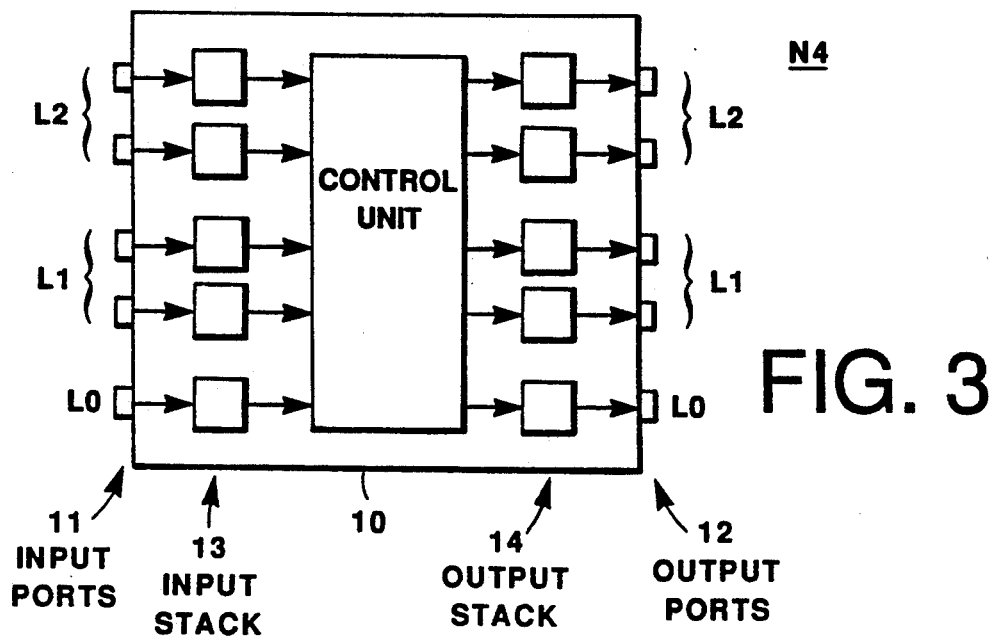
Figure 4:
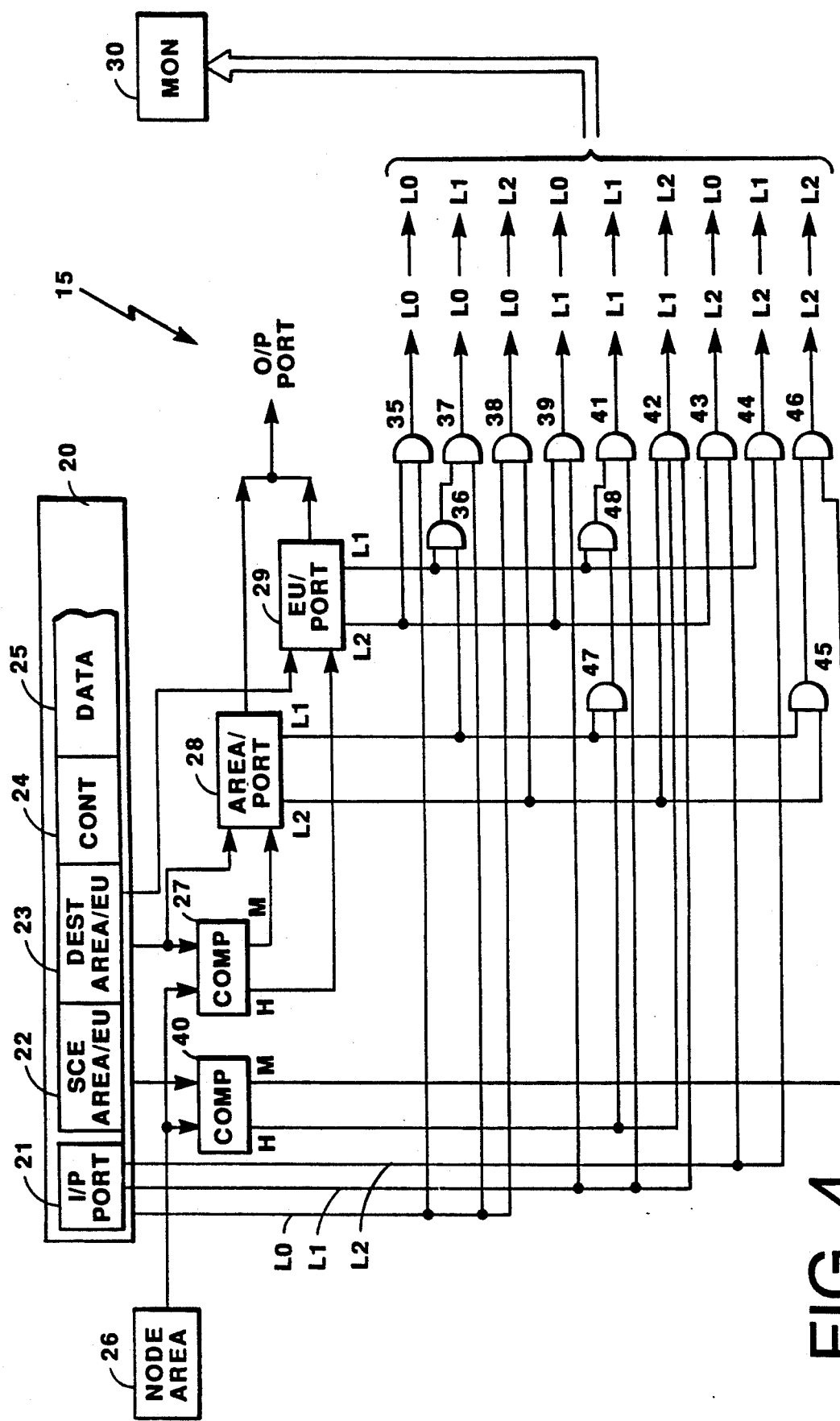

A message switching network embodying the invention will now be described, by way of example, with reference to the drawings, in which:

FIG. 1 is a block diagram which shows part of the network;

FIGS. 2A and 2B, respectively, are diagrams which show the structure of a message and of an address portion of the message;

FIG. 3 is a block diagram which shows the general structure of a switching node; and FIG. 4 is a diagram, partially in block form and partially in logic form, which shows the structure of the control portion of a node.

FIG. 1 is a block diagram which shows part of a communications network comprising several areas A1, A2, A3, . . . Area A1 contains various switching nodes N1, N2, N3, N4, . . . , and various end-users EU1, EU2, EU3, EU4, EU5, . . . Each end-user is connected to a switching node as indicated; for example, EU1 being connected to N1. The nodes in area A1 are interconnected in such a way that a path can be found between any pair of nodes (and between any pair of end-users) in the area. However, the connectivity is incomplete in the sense that there is no direct connection, for example, between nodes N1 and N4.

There are, in this case, two main indirect connections between nodes N1 and N4, via nodes N2 and N3 respectively. Depending on the details of the network and its loading, it is possible that some messages of a stream of messages from node N1 to node N4 may go through node N2 and others may go through node N3. Under certain conditions, e.g. of heavy loading or breakdown of the link between nodes N3 and N4, it is possible that a message from node N1 intended for node N4 may reach node N3 and then follow a less direct path via node N2.

The areas are in turn interconnected in such a way that a path can be found between any pair of areas. Again, however, the connectivity is incomplete, so that there may for example be no direct connection between areas A2 and A3.

The various stations in an area, such as area A1, are of two levels; the end-user stations are level 0 stations, and the switching node stations are level 1 stations. The links between these stations are correspondingly of two levels. Links between an end-user and a switching node are level 0 links, and are shown by wavy lines. Links between switching nodes are level 1 links, and are shown by straight lines. The links between different areas form a third level of links, level 2, and are shown by double lines. This distinction in level of links is not reflected exactly by a corresponding distinction in level of stations interconnected by that link, however. Rather, it is more convenient to regard an entire area as a single level 2 entity.

FIG. 1 also illustrates a further complication. We assume that the only path between areas A2 and A3 is that passing through the two level 2 links shown between areas A1 and A2 and between areas A1 and A3. These two links end at different switching nodes N3 and N4 in area A1, and the path between areas A2 and A3 therefore includes the link between nodes N3 and N4.

This path is therefore logically a level 2 link for the purposes of messages passing between areas A2 and A3, but a level 1 link for the purpose of messages which originate and/or terminate in area A1. This path can thus act as a link at either level 1 or level 2, and to symbolize this is shown as a double line with one line solid and the other line broken.

FIG. 2A is a diagram which shows the structure of a message (which is transmitted as a sequence of bytes (octets)). A message consists of 4 sections: a source address section SCE, a destination address section DEST, a control codes section CONT, and a data section DATA. The control section may include codes generated by the source end-user, such as the length of the message, the urgency of the message, etc, and codes introduced and/or modifiable by the network, such as a congestion indicator.

FIG. 2B shows the structure of an address portion of a message (the source and destination address portions have the same format). It is assumed here that the message network has a hierarchy consisting of areas, and end-users in each area. The address portion has, as shown in FIG. 2B, an area ID AREA, and an end-user ID EU. It is assumed that each end-user has an ID which is unique in its area.

FIG. 3 is a simplified block diagram of a switching node 10, such as node N4. The node has a set of input ports 11 on the left hand side and a corresponding set of output ports 12 on the right hand side. Each input port and output port form the termination of a link to another node or end-user. Each input port 11 feeds a respective input buffer 13 for temporarily storing incoming messages, and each output port 12 is fed by a respective output buffer 14 for temporarily storing messages to be sent out. The input buffers 13 and output buffers 14 are connected via a control unit 15, which determines which outputs ports the incoming messages should be passed to.

One port is a level 0 port (connected direct to an end—user), two are level 1 ports (connected to other switching nodes in the same area), and two are level 2 ports (connected to switching nodes in other areas).

The various input and output buffers may be accommodated in a common physical memory unit, with the control unit 15 determining the assignment of various areas of the memory unit to the various stacks as required. The control unit 15 may operate on a time-share basis between the different ports.

The control unit 15 contains, for routing purposes, various registers, comparators, and tables storing end-user and area IDs and corresponding output ports. FIG. 4 is a block diagram which shows the general arrangement. An input message register 20 contains an input port number section or store 21 and a message section 22-25, which in turn contains a source address section 22, a destination address section 23, a control codes section 24, and a data section 25. Each of the sections 22 and 23 contains an area ID subsection AREA and an end-user ID subsection EU. An incoming message received by an input port is passed into the register 20, along with the identity of the input port on which it was received.

The control unit 15 also includes a node area register 26, which contains the ID of the area in which the node is included. This is fed to an area comparator 27, together with the area ID from the destination section of the message in register 20. If there is no match (Miss, M) then the destination is in another area; if there is a match (Hit, H) then the destination is in the same area as the node.

An Area/ports table unit 28 stores information about how to access other areas from the node. More specifically, it contains a list of entries, each entry being an area ID together with the node output port through which messages to that area should be forwarded. On a Miss in the comparator 27 (indicating that the destination is in another area), the destination area ID is fed to this table. The table unit emits the output port number, and the message is passed to the output buffer 14 (of FIG. 3) for that port.

It will be realized that the entries in this table unit are divided into two sections. The first section contains those entries in which the output port is a level 2 port, directed to another area; the second section contains those entries in which the output port is a level 1 port, forward the message inside the local area to another node for later transmission outside the area by that node over a level 2 link.

An End-user/ports table unit 29 stores information about how to access end-users in the area from the node. More specifically, it contains a list of entries, each entry being an end-user ID together with the node output port through which messages to that end-user should be forwarded. On a Hit in the comparator 27, the destination end-user ID is fed to this table. The table unit emits the output port number, and the message is passed to the output buffer 14 (of FIG. 3) for that port.

The entries in table unit 29, like those in table unit 28, are in effect divided into two sections. The first section contains those entries in which the output port is a level 0 port, direct to the end-user; the second section contains those entries in which the output port is a level 1 port, for forwarding the message inside the local area to another node which is nearer to the destination end-user.

The lower part of FIG. 4 shows the circuitry which determines what level changes the message undergoes. For completeness, the circuitry includes means for determining all possible transitions from input level to output level (a total of 9 transitions L0→L0, L0→L1, . . . , L2→L2). It will be realized that in practice, not all transitions between levels need be detected and stored; for example, only the upwards change of level L0→L0, L0→L1, L0→L2, and L1→L2 may be recorded. Also, the message information recorded with the level transitions may be selected in dependence on the particular level transition.

A level transition L0→L0—i.e., a message passing directly from one end-user to another—is detected by an AND gate 35. This detects the combination of a message coming direct from an end-user (the input port number store 21 producing a signal L0, indicating that the input port was a level 0 port), and the message going direct to an end-user (the End-user/ports table unit 29 producing a signal L0 from its first section, indicating that the output port is a level 0 port).

A level transition L0→L1—i.e., a message coming directly from an end-user and being passed on to another switching node—is detected by an OR gate 36 and an AND gate 37. The OR gate 36 detects when the message is leaving the node on a level 1 link (signal L1 from second section of either the Area/ports table unit 28 or the End-user/ports table unit 29). The combination of this condition with the message coming direct from an end-user (signal L0 from input port number store 21) is detected by AND gate 37.

A level transition L0→L2—i.e., a message coming directly from an end-user and being passed directly out of the area—is detected by an AND gate 38. This detects when the message has come direct from an end-user (signal L0 from the input port number store 21) and is going directly to another area (signal L2 from the first section of the Area/ports table unit 28).

A level transition L1→L0—i.e., a message coming from another node in the area and being passed directly to an end-user is detected by an AND gate 39. This detects when the message has entered the node on a level 1 link (signal L1 from the input port number store 21) and is going directly to an end-user (signal L0 from the first section of the End-user/ports table unit 29).

A level transition L1→L1—i.e., a message which has originated and/or will terminate in the area and is passing between two nodes in the area—is detected by a comparator 40, two AND gates 41 and 47, and an OR gate 48. The comparator 40 is fed with the node area ID from unit 26 and the source area from the AREA subsection of the source section 22 of the message. A match (Hit, H) indicates that the message has originated in the area; no match (Miss, M) indicates that the message has originated outside the area. Signal L1 from the input port number store 21 is fed to AND gate 41, so that that gate can only produce an output signal if the message enters at level L1. Signal L1 from the End-user/ports table unit 29 passes through OR gate 48 to gate 41; this signal indicates that the message is leaving via a level 1 port and will terminate in the area. Signal L1 from the Area/ports table unit 28 indicates that the message will terminate at a different node within the area, so this signal is combined with signal H from comparator 40 (indicating that the message originated in the area) by AND gate 47, which also feeds gate 48.

A level transition L1→L2—i.e., a message coming from an end-user in the area but indirectly via another node and being passed directly to another area—is detected by an AND gate 42. This detects the combination of the message entering the port on a level 1 link (signal L1 from the input port number store 21), leaving the port to another area (signal L2 from the first section of the Area/ports table unit 28), and having originated in the area (signal H from comparator 40).

A level transition L2→L0—i.e., a message coming directly from another area and being passed directly to an end-user—is detected by an AND gate 43, which detects the combination of the message going directly to an end-user (signal L0 from the End-user/ports table unit 29) and coming from outside the area on a level 2 link (signal L2 from the input port number store 21).

A level transition L2→L1—i.e., a message coming directly from another area and being passed indirectly to an end-user in the area via another node—is detected by an AND gate 44, which detects the combination of the message coming from outside the area on a level 2 link (signal L2 from the input port number store 21) and the message passing on to an end-user in the area indirectly via another node (signal L1 from the second section of the End-user/ports table unit 29—the fact that this table unit has been used shows that the destination of the message is in the area).

A level transition L2→L2—i.e., a message coming from another area and being passed to another area—is detected by an OR gate 45 and an AND gate 46. Signal M from the comparator 40 indicates if the message has come from another area, and a signal (L1 or L2) from the Area/ports table unit 28 indicates that the signal is going to another area. These combinations of signals are detected by the OR gate 45 and AND gate 46.

Variations on this scheme are possible. For example, with the scheme as described, a message originating in the area and with a destination outside the area may be counted twice, as an L0→L1 transition and an L1→L2 transition, or it may be counted once, as a single L0→L2 transition. The logic may be modified to treat such a message as undergoing an L0→L2 transition and to ignore any intermediate level 1 links which it may pass through; and its reverse transitions at the destination end may be treated similarly.

The ports shown in FIG. 3 have been illustrated as both logical and physical ports. In practice, there is a need for an exact correspondence between logical and physical ports. In particular, a single physical link between two nodes will have a single physical port at each end, but his single port may be treated as being two separate logical ports. This would normally be done for a link such as that between nodes N3 and N4, which carries messages at two levels. If this is done, then the level transition L2→L2 can be detected more simply, since it will only ever involve a message entering a node on a L2 logical port and leaving it on another L2 logical port. (The detection of the level transition L1→L1 can be similarly simplified.)

Referring again to FIG. 4, the level change information has desired information concerning the message appended to it and the combination is fed into a monitor store unit 30. The appended information added to the level change information may, for example, include parts or all of the source and destination addresses. It may also include information extracted from the control section CONT of the message, such as the length and/or the service class (priority) of the message.

The information accumulated in the monitor store unit 30 will normally be reported to some suitable location in the system, such as an end-user owned by the area manager. It is preferred that the reporting procedure combine periodic non-confirmed reports and confirmed reports. The periodic non-confirmed reports will be sent at suitable intervals while a particular pair (or, more generally, set) of end-users are active (i.e. with messages passing between them). The information in these reports is retained in the monitor store unit 30 and can be re-sent if necessary, so confirmation of its receipt is not essential. A confirmed report will be sent when the activity has ceased, and will thus constitute a final report. Such a report will normally be confirmed, and on receipt of the confirmation, the node will flush the monitor store unit 30 of the reported information.

In summary, a message network is a switching network consisting of end units between which messages flow. The end units are connected together directly (e.g. via LANs) or via switching nodes through level 0 (L0) links. The nodes are connected together via level 1 (L1) links. The nodes are grouped into areas which are connected together via level 2 (L2) links. A message entering a node has its destination area code (23, AREA) compared with the node's area (in 26), and an area/port table 28 or an end unit/port table 29 is used to look up the output port to the end unit, or the next node in the area or the next area. Logic circuitry 35–39, 41–48 determines the incoming and outgoing levels (L0→L0, L0→L1, . . . L2→L2), and the transition is logged (at 30) together with certain details of the message. Messages are thus monitored—i.e., their passage is recorded—when they cross levels in the hierarchy.

Thus, provided the network is well-behaved, messages are accurately counted and categorized according to the distances which they travel through the network.

It has been assumed so far that each area (and each domain, if the areas are so grouped) is distinct and has a unique ID. In a large message switching network, a more complex organization is sometimes desirable. In such networks, the areas can be grouped into administrative regions. This may result, for example, from the administrative merger of two previously distinct areas; it is convenient to leave the areas with their respective IDs, rather than trying to change the ID of one of them throughout the system. This results in a system with an additional level of hierarchy. (An administrative region will be confined to a single domain if the areas are grouped into domains.)

The principles of the present system can be extended to such a system. Further, if the distinction between the areas in a single administrative region is not significant, the system can readily be modified to treat all paths within an administrative region equally whether or not they involve two areas. The manner in which this is done depends on the details of the addressing structure; it may, for example, involve matching the area IDs in the messages with the IDs of all areas in the administrative region instead of with just one area ID.

Another possible modification involves tagging the messages. As shown in FIG. 2A, the standard message structure includes a codes section, and this generally includes some unused locations. The switching nodes can be arranged to insert level tags into the codes section when a message goes up in level, and to remove them as the message makes its final descent in level as it nears its destination. These level tags can then be used for monitoring by intermediate nodes to distinguish between the levels of different messages passing over links such as the link between nodes N3 and N4 in FIG. 1.

In the system described above, each end-user is connected to a single switching node and there are no direct connections between end-users. As discussed earlier, however, some message switching systems include channels, e.g. of the local area network (LAN) type, which permit direct connections between end-users without involving intervening switching nodes. The present principles can be applied in such a system, with appropriate slight modifications of the definitions of levels with regard to links and stations as appropriate.

If, in such a system, the switching nodes only monitor messages passing through them, then messages passing directly between end-users will not be detected for monitoring. It is possible to overcome this situation by making the switching nodes monitor all message traffic on the channels (e.g. LANs) to which they are connected, so that they capture traffic on such channels passing directly between end-users. (If there are several switching nodes coupled to a single channel, then only one should be used for such monitoring.)

It is preferred, however, to provide a traffic monitor coupled to the channel which passively monitors all traffic on the channel. Such a traffic monitor can also perform much of the monitoring which would otherwise have to be done by the switching nodes connected to that channel. In effect, the traffic monitor simulates some of the functions of a switching node.

What we claim is:

1. A message switching network comprising:

a plurality of end unit stations coupled together via switching node stations, the stations having ports, the ports being ordered hierarchically by levels, the level indicating the type of link attached to the port; and monitoring means for monitoring the transitions of messages between different levels of the hierarchy as the message passes from a port of one level to a port of a different level.

2. The message switching network according to claim 1, wherein the monitoring means comprises separate monitoring units in some or all of the switching nodes.

3. The message switching network according to claim 1, wherein the links include local area networks (LANs).

4. The message switching network according to claim 3, wherein the monitoring means comprises monitoring units coupled to some or all such local area networks.

5. The message switching network according to claim 1, wherein the monitoring means includes means for inserting information into a message regarding the level transitions which it undergoes as it passes through the network, and for utilizing such information.

6. The message switching network according to claim 1, wherein:

each switching node station and end unit station is identified with an address;

the messages comprise identifiers (IDs) of source and destination addresses; and the monitoring means includes means for determining the extent to which the identifiers (IDs) of the source and destination addresses in the message match the address of the message's current location in the network.

7. The message switching network according to claim 6, wherein:

the identifier of the source address has a source address;

the identifier of the destination address has a destination address;

both the source address and the destination address include area codes; and the monitoring means is included in one of the switching node stations which also comprises means for comparing the area code of the destination address of a message with the area code of the address of the one of the switching node stations, and an area/port table and an end unit/port table for looking up one of the following, an output port of said one of the switching node stations coupled to the end unit station, a next switching node station in the same area as said one switching node station area or in another area, as indicated in the destination address ID in the message.

8. The message switching network according to claim 1 wherein the monitoring means detects upward changes of level as the message passes from a port of one level to a port of a higher level.

9. The message switching network according to claim 1 wherein the monitoring means detects downward changes of level as the message passes from a port of one level to a port of a lower level.

10. The message switching network according to claim 1 wherein the monitoring means detects a change of level as the message passes from a port of one level to a port of a different level, and the change is of more than one step, and treats such a change as a combination of single-step changes.

11. The message switching network according to claim 10 wherein the monitoring means includes means for ignoring a level change as the message passes from a port of one level to a port of a different level, and the change is from a high level to a lower level and back to the higher level.

12. A message switching network comprising:

a plurality of end unit stations coupled together through links via switching node stations, the links being ordered hierarchically by levels, the level indicating the type of link; and monitoring means for monitoring the transitions of messages between different levels of the hierarchy as the message passes from a link of one level to a link of a different level.

* * * * *